Figure 1:
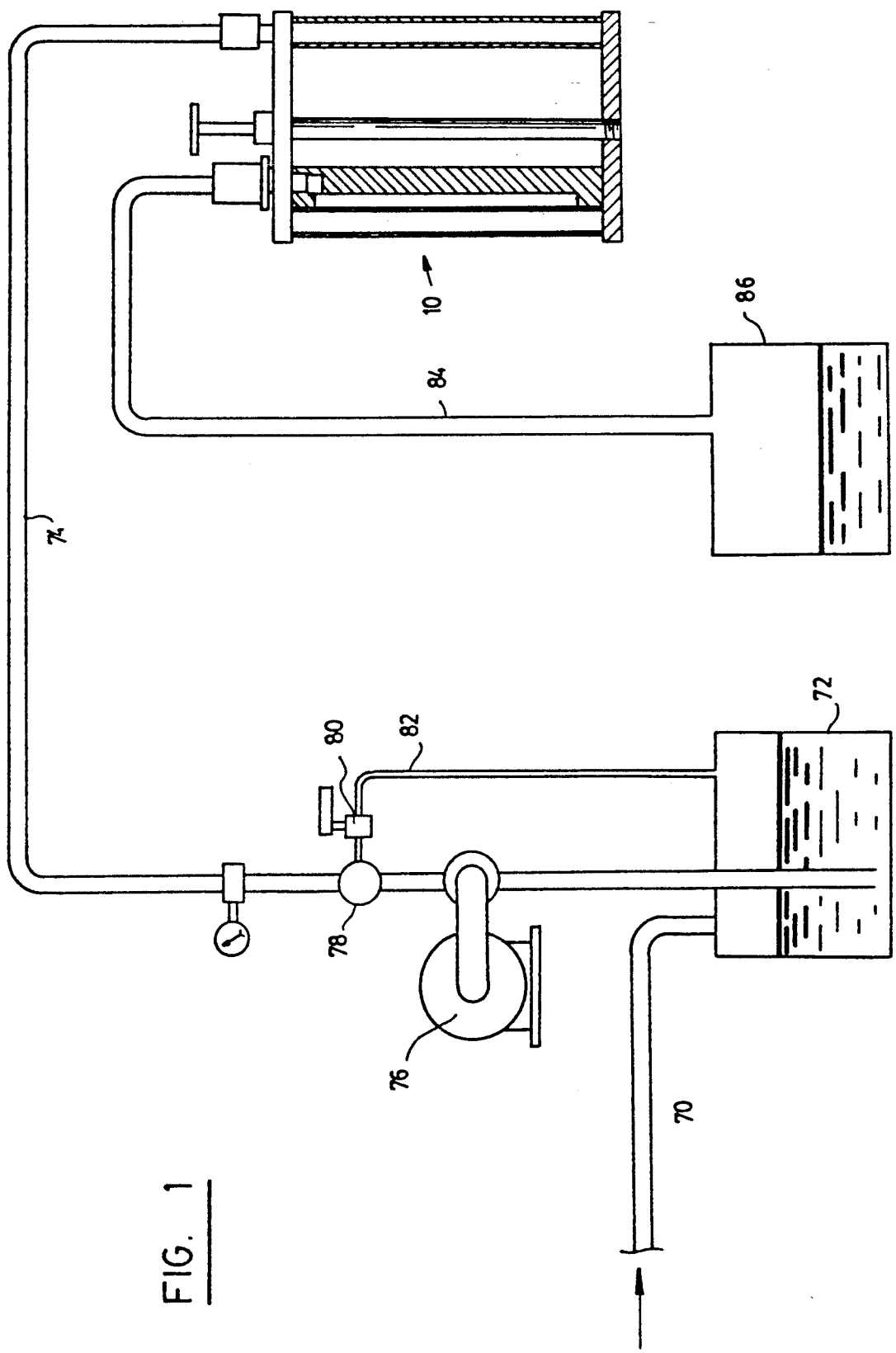

United States Patent [19]

LaPierre

[11] Patent Number: 5,082,561
[45] Date of Patent: Jan. 21, 1992

[54] HIGH PRESSURE FILTER SUPPORTS FOR LIQUIDS, SYSTEMS THEREWITH AND METHODS OF USE

[76] Inventor: Donald LaPierre, 167A, rue Principale, Saint-Ludger, Beauce-Sud Qc, Canada

[21] Appl. No.: 583,097

[22] Filed: Sep. 17, 1990

[51] Int. Cl.$^5$ .................. B01D 29/19; B01D 35/30; B01D 27/08
[52] U.S. Cl. .................. 210/232; 210/435; 210/437; 210/440; 210/455; 210/453; 210/457
[58] Field of Search .............. 210/457, 455, 232, 235, 210/435, 437, 238, 440, 453

[56] References Cited

U.S. PATENT DOCUMENTS

| 2,626,056 | 1/1953 | Macro | 210/437 |
|---|---|---|---|
| 2,670,851 | 3/1954 | Curtis | 210/435 |
| 3,508,657 | 4/1970 | Cooper | 210/232 |
| 4,507,199 | 3/1985 | Carlisle | 210/238 |
| 4,588,503 | 5/1986 | Sugiura | 210/232 |
| 4,647,373 | 3/1987 | Tokar et al. | 210/232 |
| 4,671,873 | 6/1987 | Keller | 210/232 |
| 4,725,323 | 2/1988 | Ostreicher et al. | 210/94 |
| 4,764,271 | 8/1988 | Acosta | 210/282 |
| 4,780,204 | 10/1988 | Rasmussen | 210/435 |
| 4,792,397 | 12/1988 | Rasmussen | 210/435 |
| 4,923,601 | 5/1990 | Drori | 210/232 |
| 4,935,135 | 6/1990 | Nakashima et al. | 210/232 |

Primary Examiner—Stanley S. Silverman
Assistant Examiner—Cynthia L. Nessler
Attorney, Agent, or Firm—Robic

[57] ABSTRACT

A high pressure filter support for liquids having low or high viscosity. The support is easily cleanable and quickly dismountable. The support comprises an annular passage defined between an outer larger tubular wall and an inner smaller tubular wall, top and bottom flat plates including quick release fastening means for sealingly joining the top plate to the outer and inner tubular walls to obtain the annular passage sealingly closed. Inlet means into said annular passage are provided. The inner wall inside the annular passage has on its surface a plurality of circumferential grooves. Each of the grooves has at least one orifice through the inner wall. The orifices are of a size commensurate with the viscosity of the material to be displaced through the orifices. An outlet means is sealingly mounted on the surface of the inner wall away from the annular passage to receive the orifices. A system for making maple syrup comprising an evaporator, a filter as defined above is also disclosed. A process for the filtration of maple syrup is also disclosed. It comprises evaporating sap to obtain a syrup, feeding under pressure the syrup, by passing under pressure the syrup between a pair of concentric tubular walls as defined above, the syrup passing from said concentric tubular walls to a filter along said grooves to said orifices, and collecting from said orifices said syrup so filtered.

11 Claims, 4 Drawing Sheets

HIGH PRESSURE FILTER SUPPORTS FOR LIQUIDS, SYSTEMS THEREWITH AND METHODS OF USE

FIELD OF THE INVENTION

This invention relates to high pressure filter supports for liquids having low or high viscosity, systems therewith and methods of use. This invention particularly relates to such systems for filtering maple syrup and to a processes therefor.

BACKGROUND OF THE INVENTION

It is well known to make maple syrup. However, when one wishes to obtain filtration of such syrup, there are numerous problems, particularly if one wishes to use a high pressure filtering system. Such systems are not easy to dismantle, the filters are difficult to change and in general, high pressure systems are expensive.

THE INVENTION

In accordance with this invention, Applicant is now providing a filter support which is easy to dismantle. It is also easy to change the filters as will be described hereinbelow. The maintenance cost and the cleaning cost of such systems as described hereinbelow are rather low. High pressure or vacuum could be used.

Broadly stated, the invention is directed to a high pressure filter support for liquids having low or high viscosity, said filter being easily cleanable, quickly dismountable, and comprising:

an annular passage defined between an outer larger tubular wall and an inner smaller tubular wall, top and bottom flat plates including quick release fastening means for sealingly joining said top plate to said outer and inner tubular walls to obtain said annular passage sealingly closed, inlet means into said annular passage, said inner wall inside the annular passage having on its surface a plurality of circumferential grooves, each of said groove having at least one orifice through said inner walls, said orifice of a size commensurate with the viscosity of the material to be displaced through said orifices, on the surface of said inner wall away from said annular passage, and sealingly mounted thereon, outlet means receiving said orifices.

The invention is also directed tc ı process for the filtration of maple syrup comprising:

evaporating sap to obtain a syrup, feeding under pressure said syrup, by passing under pressure said syrup between a pair of concentric tubular walls, the innermost wall having mounted thereon a filter and said innermost wall being provided with a plurality of circumferential grooves, each of said groove having at least one orifice, and collecting from said at least one orifice said syrup so filtered.

The invention is also directed to a system for making maple syrup comprising an evaporator, a filter as defined above, said inlet being connected to said evaporator by a line having a pumping means for delivering from said evaporator to said filter a sap from said evaporator.

When one refers to orifice of a size commensurate with the viscosity of the material, this means that if a pasty material is highly viseous it normally requires larger orifices as appose to materials that are highly liquid or fluid.

Figure 2:
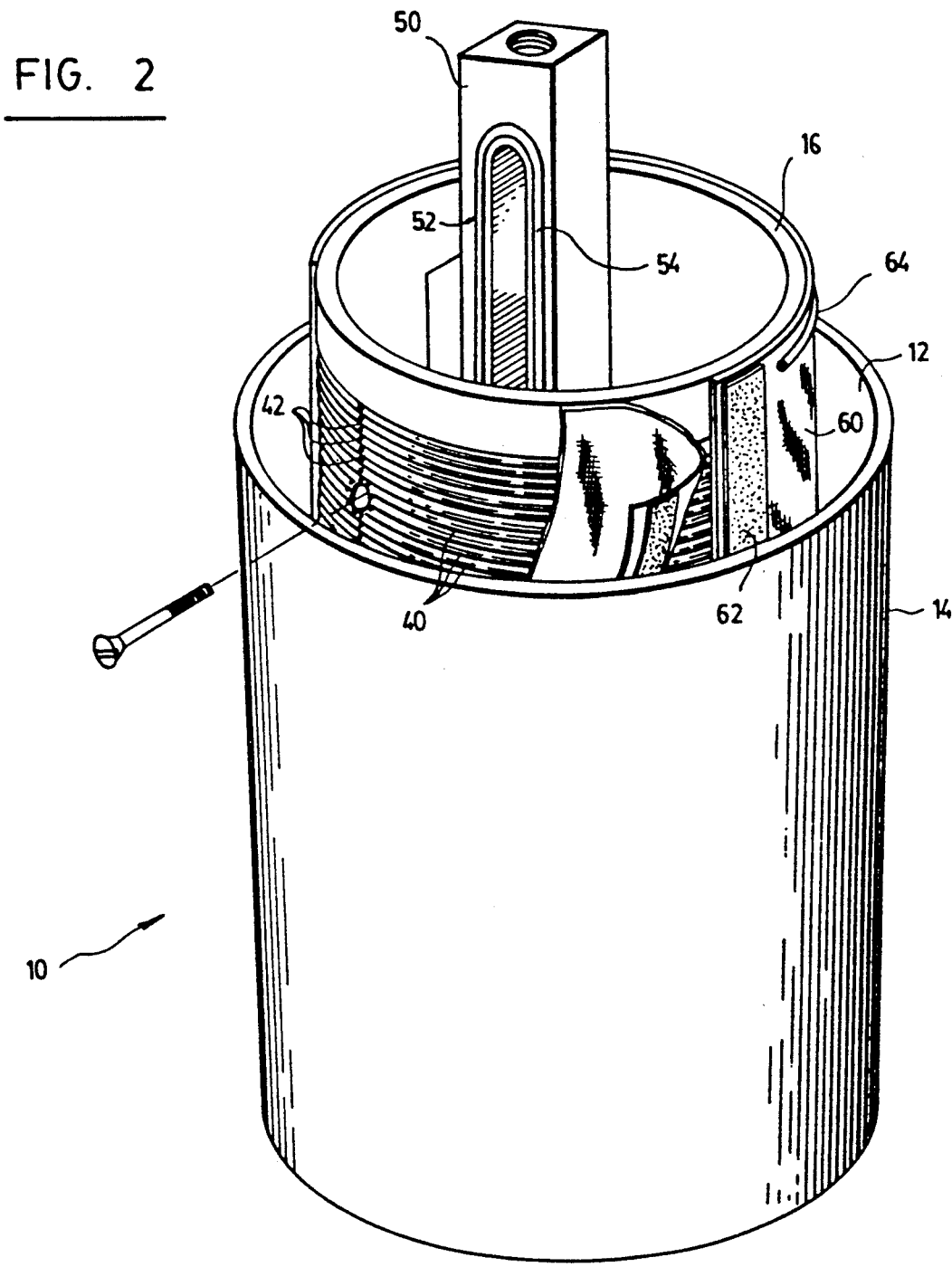
Figure 3:
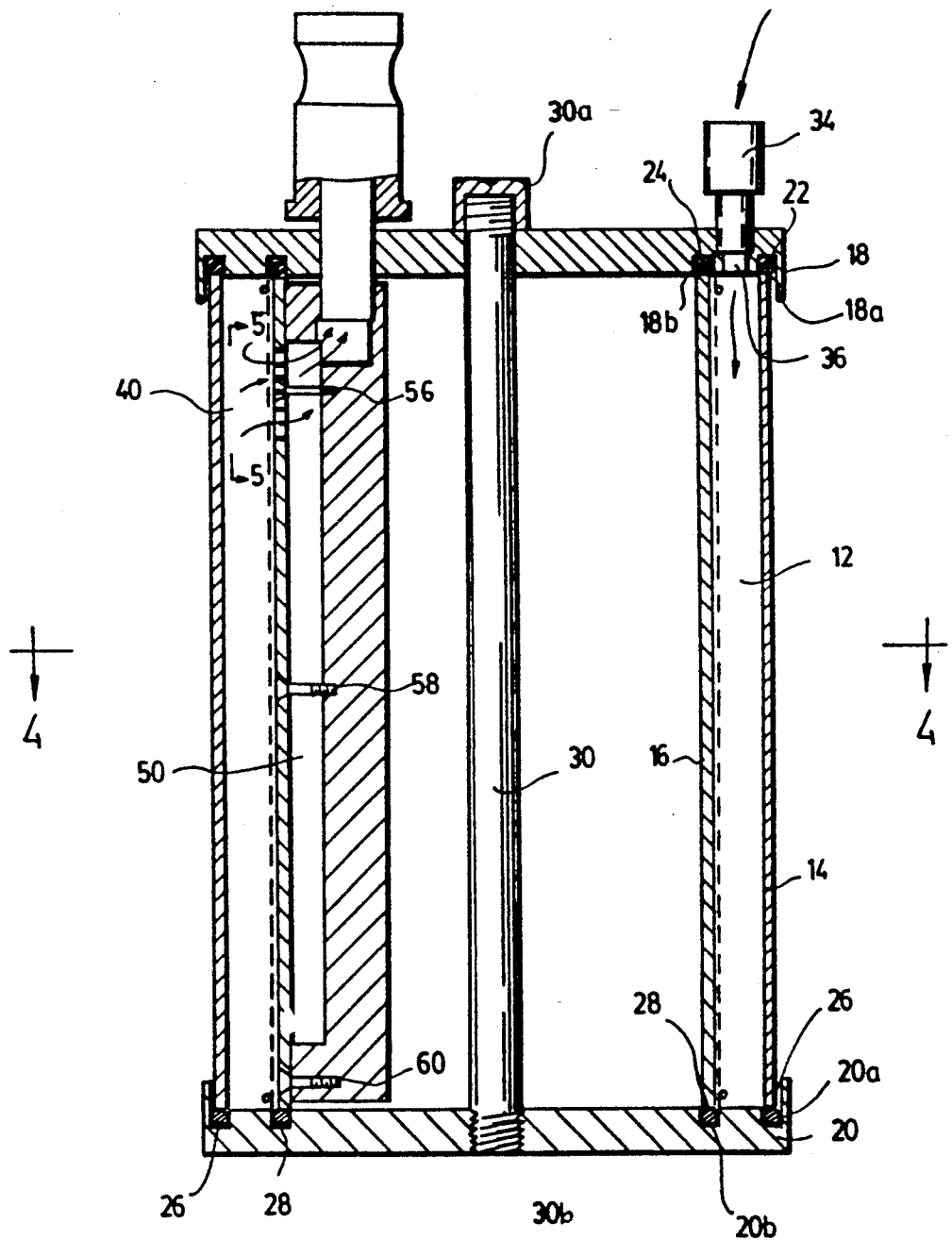
Figure 4:
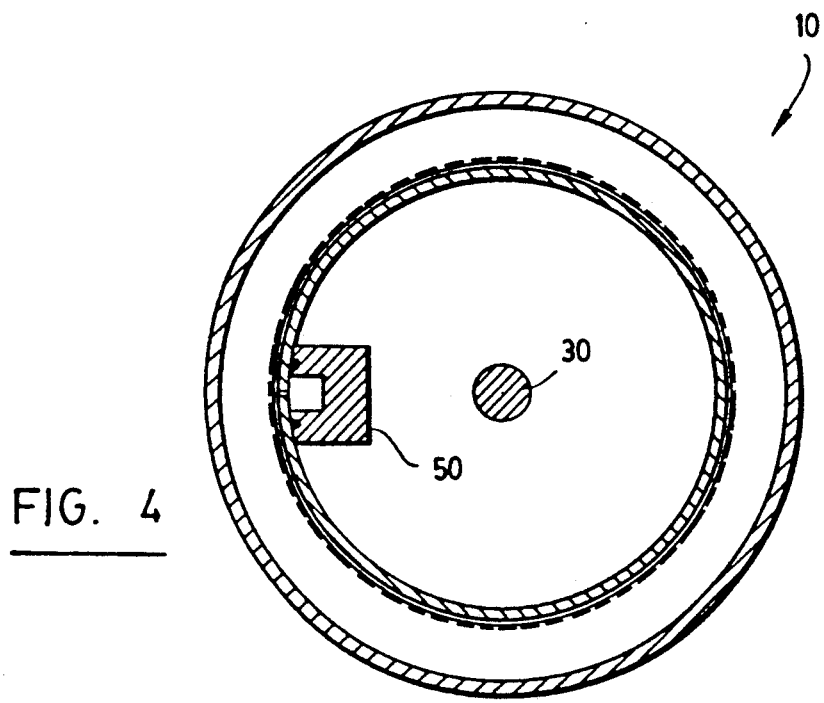
Figure 5:
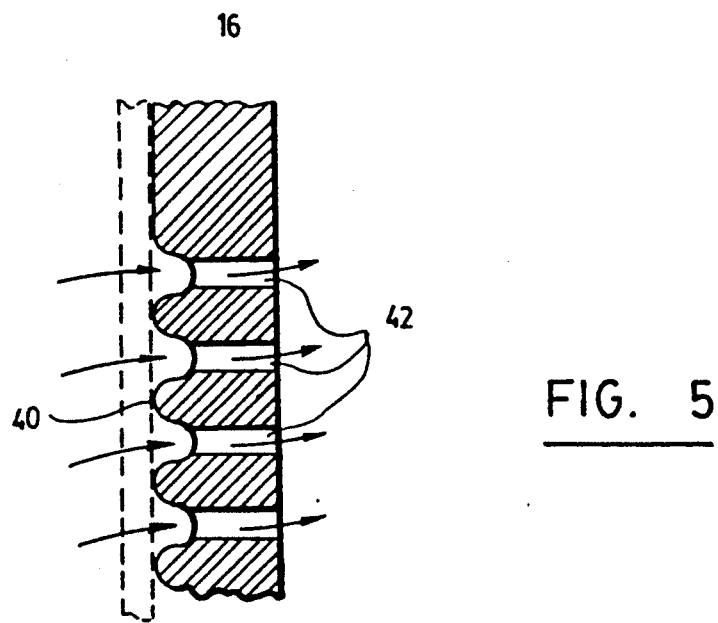

Referring now to the drawings which illustrate a preferred embodiment of the invention, FIG. 1 is a schematic drawing illustrating in cross section a filter shown to be used in association with auxiliaries for the filtration of maple syrup, FIG. 2 is a perspective and partly exploded view illustrating a filter support with a filter and having its top removed, FIG. 3 is a cross sectional view of the filter shown in FIG. 2, FIG. 4 is a view taken along line 4—4 of FIG. 3, FIG. 5 is an enlarged portion of a view taken along line 5—5 of FIG. 3.

Referring now to FIG. 2, the filter support 10 comprises an annular passage 12 defined between an outer larger tubular wall 14 and an inner smaller tubular wall 16. These walls are securely mounted onto a top and bottom plates 18 and 20 better shown on FIG. 3 and spaced apart by means of two annular grooves 18a, 18b, 20a and 20b. The diameter and thickness of each of said grooves correspond substantially to those of said tubular walls 14 and 16 so that said walls can snuggly fit into said grooves. The grooves 18a, 18b, 20a and 20b have mounted therein each respectively, a O ring 22, 24, 26 and 28.

The plates 18 and 20 are compressed together by means of a compressing rod 30 which urges the plates 18 and 20 together, thereby compressing the O ring for sealingly joining the top plate to the inner and outer tubular walls and similarly the bottom plate to said inner and outer tubular walls, thereby enabling a passage able to withstand high pressure. Conveniently, the rod 30 has a screwing cap or nut 30a pushing the top plate 18, and a thread end male portion 30b engaging a female counterpart in the bottom plate, the plates could even be exchanged, the top becoming the bottom and the bottom the top. Preferably these top and bottom plates are round flat plates as shown. By a mere untwisting of rod 30, one has a quick access to all the simple components of the support and the filter.

The annular passage 12 between the outer larger tubular wall 14 and the inner smaller tubular wall 16 is provided with an inlet 34 securely mounted on plate 18. The plate 18 also comprises an orifice 36 between a threaded inlet 34 mounted on the top and the annular passage 12. The inner smaller tubular wall 16 inside the annular passage has on its surface a plurality of circumferential grooves 40 better shown on FIG. 2 enabling a very large filtering surface and a better liquid distribution all around the grooves as compared to any filtering fabric. Each of these grooves 40 has an orifice 42 to communicate between the two surfaces of the inner smaller tubular wall 16. Preferably, these orifices are aligned vertically as a single line, as shown in FIG. 2, to enable a single and simple outlet or collecting means, shown at 50 removed from the inner smaller tubular wall 16. The outlet means is preferably a U-shaped channel member having on its opened face a peripheral groove 52 for receiving a resilient ring 54 which will be in sealing engagement with the surface of the inner smaller tubular wall by fastening devices 56, 58 and 60 (shown in FIG. 3).

When one looks at the smaller tubular wall 16 inside the annular passage 12, one sees a sinusoidal surface as shown more particularly at FIG. 5. Each of said row has a groove and at least an orifice 42, through the wall 16. These grooves 40 may be obtained by a plurality of circumferential ribs if one so wishes.

Referring to FIG. 2, one also sees on the surface of the inner tubular wall 16 containing the sinusoidal surface a filter 60 forming a tubular filter. The filter may be for instance a polyester filter of which the ends are joined together by means of any known interlocking and releasable fastener elements which may preferably be bands 62 of the VELCRO type running along the length of the tubular filter and having O-ring 64 at each of its circumferential edges for tightly securing the filter onto the portion for supporting a filter as obtained by the sinusoidal surface.

The invention, as shown on FIG. 1 is applicable to a system for making a maple syrup and may be running on-line with an evaporator connected by line 70 to a maple syrup reservoir 72. From the reservoir 72 a line 74 is connected to a filter 10. Said line 74 is provided with a pump 76, and conveniently with pressure gauge 78 and safety valve 80 leading to valve outlet line 82. The outlet of the filter 10 is itself connected to filter outlet line 84 and to a collecting reservoir 86 for receiving the filtered maple syrup.

If desired, one can do away with reservoir 72 and substitute therefor the evaporator to which line 70 is connected.

As is easily seen a new method is also provided wherein after being obtained by evaporating a sap, a syrup is fed by passing it under pressure between a pair of concentric tubular walls the innermost wall having mounted thereon a filter and said innermost wall being provided with a plurality of circumferential grooves, each of said groove having at least one orifice, the syrup passing from said concentric tubular walls to a filter along said grooves to said orifices, and collecting from said orifices said syrup so filtered.

There is also described a system for making maple syrup comprising an evaporator, a filter as defined above wherein the inlet of the filter is connected to a sap evaporator by a line having a pumping means for delivering from the evaporator to the filter a sap from the evaporator.

It should be noted that the syrup may arrive in a highly viscous or pasty but is generally filtered at a temperature 125°-220° F. and preferably 220+-10° F. Pressure of 75 PSI could easily said filter and generally up to 100 PSI. It will be evident that this apparatus and the method could be used for other liquid or pasty materials, oils.

Although the present invention has been explained hereinabove by way of preferred embodiments thereof, it should be pointed out that any modifications to these preferred embodiments, within the scope of the appended claims, is not deemed to change or alter the nature and scope of the invention.

The embodiments of the invention in which an exclusive property or privilege is claimed are defined as follows:

1. A high pressure filter support for a liquid having low or high viscosity, said support being easily cleanable, quickly dismountable and comprising:

an outer larger tubular wall and an inner smaller tubular wall defining therebetween an annular passage, said outer and inner walls both having opposite ends;

top and bottom plates including quick release fastening means for sealingly joining said plates to the opposite ends of said outer and inner tubular walls to sealingly close said annular passage, inlet means into said annular passage, said inner wall having an outer surface inside the annular passage and an inner surface, said outer surface being provided with a plurality of circumferential grooves, each of said grooves leading into at least one orifice through said inner wall, said orifices being disposed in vertical alignment between said top and bottom plates and being of a size commensurate with the viscosity of the liquid, outlet means sealingly moved on the inner surface of said inner wall opposite said annular passage, said outlet means receiving said liquid from said orifices, said outlet means comprising a U-shaped channel member pressure-sealed onto said outer surface of inner wall over said vertically aligned orifices and into which said filtered liquid is received.

2. The filter support as defined in claim 1, wherein said top and bottom plates are flat.

3. The filter support as defined in claim 1, wherein each of said plates is provided with two concentric annular grooves, the diameter and thickness of each of said annular grooves corresponding substantially to those of said tubular walls, each of said annular grooves having mounted therein an O-ring, the ends of said tubular walls fitting into said annular grooves in sealing engagement with said O-rings, and wherein said quick release fastening means comprise a centrally positioned compression rod, having one end secured to one of said plates and another opposite end threaded and extending through the other plate, and a screwing nut mounted on said threaded end and applying pressure on said other plate, thereby urging said plates toward one another and pressing said ends of said tubular walls against said O-rings.

4. The filter support as defined in claim 1, wherein said inlet means is a conduit means mounted on the top plate and engaging a duct defined in said top plate.

5. The filter support as defined in claim 1, wherein said circumferential grooves define on the outer surface of said inner tubular wall a sinusoidal surface.

6. The filter support as defined in claim 1, further comprising a tubular filter mounted over said circumferential grooves for filtering liquid prior to the entrance thereof into said grooves and orifices.

7. The filter support as defined in claim 6, wherein said filter is retained by a band running along its length.

8. The filter support as defined in claim 6, wherein said filter has upper and lower circumferential edges each provided with an O-ring for tightly securing said filter onto said filter support.

9. A high pressure filter support for a liquid having low or high viscosity, said support being easily cleanable, quickly dismountable and comprising:

an annular passage defined between an outer larger tubular wall and an inner smaller tubular wall, top and bottom flat plates including quick release fastening means for sealingly joining said top plate to said outer and inner tubular walls to sealingly close said annular passage;

inlet means into said annular passage, said inner wall inside the annular passage having an outer surface within said annular passage and an inner surface, said outer surface having a plurality of circumferential grooves, each of said grooves having at least one orifice through said inner wall, said orifices being of a size commensurate with the viscosity of the material to be displaced through said orifices, and outlet means sealingly mounted on the inner surface of said inner wall away from said annular passage for receiving the liquid passing through said orifices, wherein each of said circumferential grooves of said inner wall leads into one orifice through said inner wall, said orifices forming a row, and wherein said outlet means is an elongated pressurizable channel, said channel being U-shaped and being provided along its periphery joining the outer surface of the inner wall with a groove for receiving an O-ring, an O-ring in said groove sealingly closing said U-shaped channel to said inner wall, over said orifices, said inner wall further comprising fastening means to urge said channel against said inner smaller tubular wall.

10. The filter support as defined in claim 9, further comprising a tubular filter mounted over said circumferential grooves for filtering liquid prior to the entrance thereof into said grooves and orifices.

11. A system for filtering maple syrup comprising:
an evaporator;
a high pressure filter support comprising:
an outer tubular wall and an inner tubular wall defining therebetween an annular passage;
top and bottom flat plates and quick release fastening means joining said plates to the ends of said outer and inner tubular walls and sealingly closing said annular passage;
maple syrup inlet means opening into said annular passage;
a tubular filter mounted onto said inner tubular wall inside said annular passage;
said inner wall having along the surface thereof inside said annular passage, a plurality of circumferential grooves, each groove leading into an orifice through said inner wall, said orifices being of a size commensurate with the viscosity of the maple syrup movable through said orifices; and
outlet means sealingly mounted on the surface of said inner wall opposite said annular passage, said outlet means being constructed for receiving filtered maple syrup from said annular passage through said orifices;

wherein said orifices through said inner tubular wall are disposed in a row, said outlet means defining an elongated pressurizable channel, said channel being U-shaped and being provided along its periphery joining the surface of the inner smaller tubular wall with a groove for receiving an O-ring, an O-ring being mounted in said groove for sealingly closing said U-shaped channel to said inner smaller tubular wall, said inner tubular wall further comprising fastening means to urge said channel against said inner tubular wall, and wherein said inlet means are connected to said evaporator by a pipeline having pumping means therealong, capable of delivering maple syrup from said evaporator to said inlet means of said filter support.

* * * * *